Aug. 12, 1930.   T. S. KNAP   1,772,577
CONVEYER
Filed Jan. 22, 1929
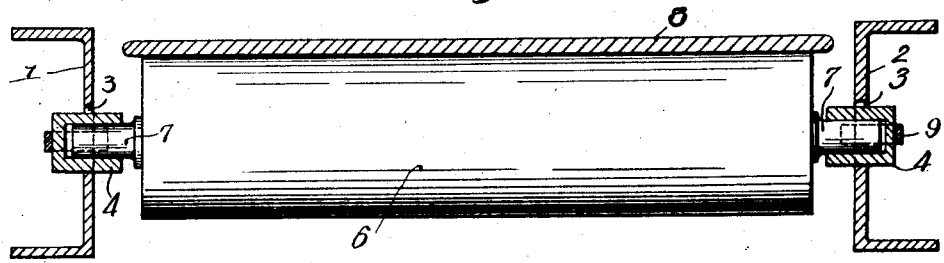
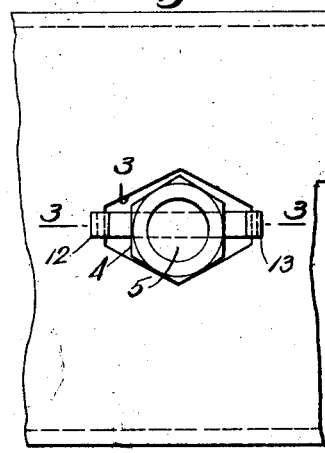
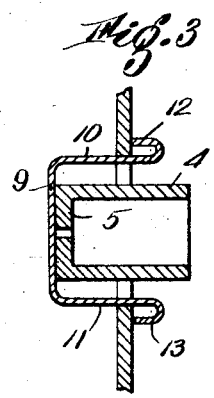
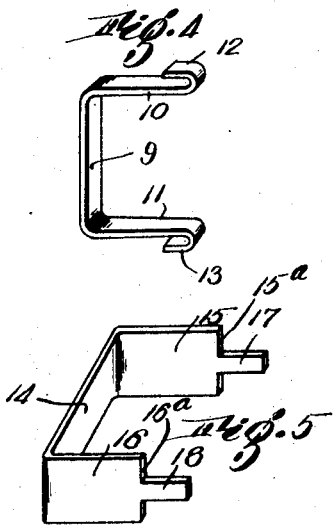
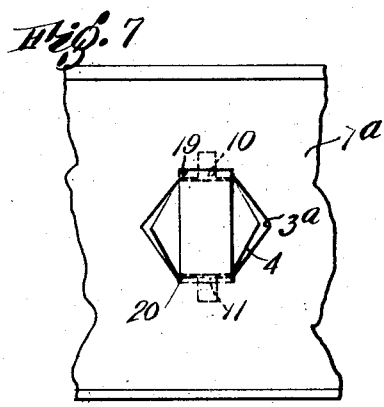
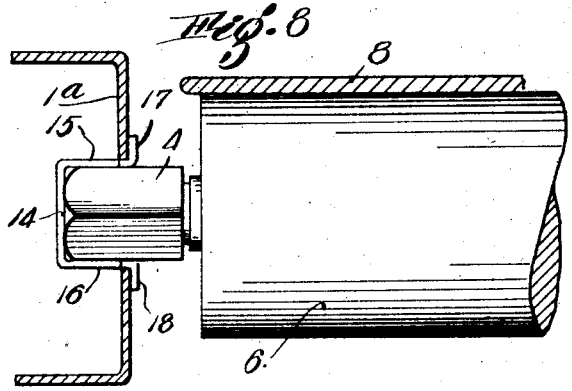
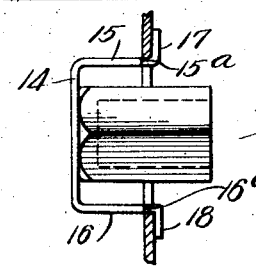
Inventor
Thomas S. Knap
by Roberts Cushman Woodbury
his Attorneys Patented Aug. 12, 1930

1,772,577

UNITED STATES PATENT OFFICE

THOMAS S. KNAP, OF SYRACUSE, NEW YORK, ASSIGNOR TO THE LAMSON COMPANY, OF SYRACUSE, NEW YORK, A CORPORATION OF MASSACHUSETTS

CONVEYER

Application filed January 22, 1929. Serial No. 334,305.

This invention pertains to conveyers of that type in which articles to be conveyed rest directly upon a series of rollers or upon a conveyer belt supported by such rollers, and relates more particularly to improved supporting means for the rollers. Usually the rollers are mounted in journal bearings carried by parallel elongate supporting rails which are relatively fixed and not readily separated when once installed. Each roller has a shaft or spindle projecting from each end and while the rollers may be assembled between the rails when the latter are installed, it is difficult, except by the use of specially designed bearing members, to remove individual rollers after installation for repairs or replacement.

In the patent to Cowley 1,541,410, dated June 9, 1925 there is disclosed a roller of the type above referred to and also a bearing member normally rigidly locked in position but removable outwardly from the rails when it is desired to remove the roller. This Cowley device is practical and useful, but under some conditions of use it is desirable to allow the bearing members to move to a limited extent relatively to the supporting rails in order to permit self-alignment of the bearings at opposite ends of the rollers. In accordance with the present invention the bearings and rollers may be of the general type illustrated in the aforesaid patent to Cowley, but novel means is provided for removably retaining the bearings in place in the supporting rails, such novel retaining means permitting the bearings to swing or oscillate slightly relatively to the rail, thus avoiding any cramping of the parts or undue wear of the bearings by reason of slight relative changes in position of the rails, and requiring less care in the original installation of the parts.

In the accompanying drawings certain desirable embodiments of the invention are disclosed by way of example, and in the drawings Fig. 1 is a vertical section on the plane of the axis of one of the rollers, showing the roller arranged to support a conveyer belt;

Fig. 2 is a fragmentary elevation, to larger scale, looking toward the inner side of one of the supporting rails, the roller being omitted but showing the bearing in position;

Fig. 3 is a section on line 3—3 of Fig. 2;

Fig. 4 is a perspective view illustrating one desirable form of bearing retaining clip;

Fig. 5 is a similar view illustrating a modified form of clip or retainer;

Fig. 6 is a fragmentary view generally similar to Fig. 3, but to smaller scale, showing the bearing member in plan and illustrating the employment of the clip of Fig. 5;

Fig. 7 is a fragmentary elevation, looking at the outside of one of the supporting rails, and illustrating a modified construction; and Fig. 8 is a fragmentary section similar to Fig. 1 but to larger scale and illustrating the modified arrangement of bearings shown in Fig. 7.

Referring to the drawings the supporting rails are indicated at 1 and 2 respectively. These rails may be of any desired length and as shown are of channel section. Each rail has a series of openings 3, the opening in one rail being substantially aligned with corresponding openings in the other rail.

In each opening there is arranged a bearing member 4. These bearings are of sleeve-like form, preferably substantially closed at their outer ends at 5 to prevent the entrance of dirt and dust. As here shown, these bearing sleeves 4 are of regular hexagonal external contour, although they may be of other shape if desired. As indicated in Fig. 2, the bearing opening 3 is also of hexagonal contour but is elongate horizontally, so that the bearing can freely move within the opening as, for example, by oscillating in a substantially horizontal plane about its point of engagement with the lower edge of the opening.

The roller 6 may be of any desired type, for example, such as shown in the patent to Cowley above referred to, and is provided with fixed spindle members 7 adapted to turn within the journal openings in the bearing sleeves 4. The series of rollers 6 may form the immediate support for the articles to be conveyed or may support a conveyer belt 8 upon which the articles rest.

As thus far described the bearings 4 would be freely removable outwardly from the openings 3, and it is necessary to provide some form of retainer for holding the bearings in place. Since it is sometimes necessary to remove individual rollers for repairs or replacement, I prefer to employ a type of retainer for the bearings which will permit the bearings to be removed at will, and since, in accordance with the present invention, it is desired to permit the bearings to have some freedom of movement in the opening 3, it is essential that the bearing-retaining member shall not seriously interfere with such movement.

In Fig. 4 I have indicated one desirable form of retainer consisting of a U-shaped clip conveniently formed by bending a piece of resilient sheet metal, such clip comprising the end member 9 and the substantially parallel legs 10 and 11. The free ends of these legs are turned outwardly and preferably folded, as shown at 12 and 13, to provide ears adapted, as indicated in Fig. 3, to engage the inner surface of the supporting rail and thus to prevent outward movement of the retaining clip under normal condition. As indicated in Figs. 2 and 3, the legs of this clip extend through the opening 3, the clip occupying a generally horizontal position, so that the legs 10 and 11 embrace the bearing 4 although being spaced therefrom. The end member 9 normally engages the outer end 5 of the bearing, and as the retaining member is prevented from moving outwardly with respect to the rail by the parts 12 and 13, the bearing 4 is thus held in proper position. However, when it is desired to remove a bearing, the members 12 and 13 are pressed toward each other until they are disengaged from the edges of the opening 3, whereupon the retainer with the bearing may be withdrawn outwardly from the openings in the rails. Having released one or both bearings in this way, the roller may be removed for repairs or replacement. In this arrangement, although the bearing is prevented from moving axially outward, its oscillation in the opening 3 is not substantially interfered with and the bearings are free to align themselves in accordance with any slight relative movement of the rails, such as may occur from settlement of the structure in which they are installed.

In Figs. 5 and 6 I have illustrated a slightly modified form of retainer or clip which, in this instance, need not be of resilient material, although of the same general U-shape as the clip previously described and adapted for use in the same general way. This clip comprises the end member 14, the legs 15 and 16, and the tabs or ears 17 and 18 which in use are bent outwardly at substantially right angles to the legs, as shown in Fig. 6, for engagement with the rail at opposite sides of the opening. Preferably the member 14 is of such width that the shoulders at 15ª and 16ª bear against the outer surface of the rail, thus limiting inward movement of the clip, even in the absence of the bearing and roller. When this device is to be removed, the parts 17 and 18 are bent into substantial alignment with the main body of the corresponding leg thus permitting the retainer to be withdrawn from the opening.

In Figs. 7 and 8 I have shown a modification in which the rail 1ª is provided with the opening 3ª for the reception of the bearing 4. In this instance the opening more nearly approaches a regular hexagon in shape than in Fig. 2, but is provided at its upper and lower sides, which are horizontally disposed, with recesses or pockets adapted to receive the tabs 17 and 18 of the retaining clip. Thus, in this instance, the clip is arranged in a substantially vertical plane and its lower leg 16 forms a support (Fig. 8) upon which the lower horizontal face of the bearing 4 may rest. The clip shown is of the type indicated in Fig. 5 and thus arranged provides a broad support for the bearing 4 so that there is less tendency to develop wear than where the bearing rests directly upon the narrow edge of the rail. Obviously, by properly shaping the opening in the rail, a clip of the kind shown in Fig. 4 could be used in the position indicated in Fig. 7.

I claim:

1. A device of the class described comprising a support having an opening therein, a bearing within the opening, the opening being of such size relatively to the bearing as to permit the bearing to swing to a limited extent in one plane at least, a roller shaft journalled in the bearing and constructed and arranged to limit axial movement of the bearing in one direction and a retainer extending through the opening and having a portion engageable with the support to prevent withdrawal of the retainer from the opening, said retainer also comprising a part engageable with the bearing to prevent axial movement of the latter in the opposite direction.

2. A device of the class described comprising a support having an opening therein, a bearing within the opening, the opening being of such size relatively to the bearing as to permit the bearing to swing to a limited extent in one plane at least, a roller shaft journalled in the bearing and constructed and arranged to limit axial movement of the bearing in one direction, and a retainer comprising spaced legs extending through the opening at opposite sides respectively of the bearing, said legs having portions normally engaging the support to prevent withdrawal of the retainer from the opening, the retainer also comprising a part engaging the bearing to prevent axial movement of the latter in the opposite direction.

3. A bearing retainer for use in conveyers wherein a roller spindle-bearing is mounted in an opening in a support, said retainer being of U-shape and adapted to fit within the opening, the legs of the retainer having outwardly directed portions engaging the inner side of the support at opposite sides of the opening normally to prevent withdrawal of the retainer by movement in one direction at least, from the opening.

4. A bearing retainer for use in conveyers wherein a roller spindle-bearing is mounted in an opening in a support, said retainer having spaced resilient members adapted to fit within the opening and having outwardly directed ears adapted to engage the support at opposite sides of the opening whereby normally to prevent withdrawal of the retainer from the opening by movement in one direction, said ears being disengageable from the support by movement toward one another, the support comprising a part engageable with a bearing disposed in the opening to prevent axial movement of the bearing in one direction.

5. A U-shaped bearing retainer of the class described comprising substantially parallel arms and an end member, the arms being spaced to receive a bearing between them, the end member of the retainer constituting a stop engageable with the outer end of the bearing to limit movement of the bearing in one direction, the free ends of the arms comprising parts adapted to constitute stops engageable with the inner side of a bearing support to prevent bodily movement of the retainer in said direction.

6. A conveyer comprising a support having an opening therein, a bearing sleeve mounted in the opening, the opening being of such size relative to the bearing as to permit limited lateral oscillation of the sleeve in the opening, the sleeve having a journal opening for the end of a roller spindle, and retaining means engaging the bearing on the outer side of the support and normally preventing axial movement of the bearing such as to disengage it from the spindle while permitting lateral oscillation of the bearing with respect to the support.

7. A conveyer comprising a support having an opening therein, a bearing sleeve mounted in the opening, the opening being of such size relative to the bearing as to permit limited lateral oscillation of the sleeve in the opening, the sleeve having a journal opening for the end of a roller spindle, and a spring clip normally preventing disengagement of the bearing from the spindle while permitting the bearing to oscillate laterally in the opening.

8. A device of the class described comprising a supporting plate having an opening therein, a bearing sleeve disposed within the opening, the opening being of such size relatively to the sleeve as to permit limited lateral oscillation of the sleeve in the opening, and a U-shaped retainer disposed in the opening with one of its legs underlying the bearing sleeve, the legs of said retainer having outwardly directed ends overlapping the support at opposite edges of the opening and normally preventing movement of the retainer in one direction axially of the opening.

9. A device of the class described comprising a pair of spaced parallel rails constituting supports, each rail having an opening therethrough, the openings being substantially aligned, a bearing sleeve disposed in each opening, a roller interposed between the rails, the roller having spindle members journalled in the respective bearing sleeves, and a U-shaped clip embracing each bearing, the closed end of the clip engaging the outer end of the bearing and the legs of the clip passing inwardly through the opening in the adjacent rail and having out-turned ears at their inner ends normally preventing withdrawal of the clip outwardly through the opening.

10. A device of the class described comprising a pair of spaced parallel rails constituting supports, each rail having an opening therethrough, the openings being substantially aligned, a bearing sleeve disposed in each opening, a roller interposed between the rails, the roller having spindle members journalled in the respective bearing sleeves, and a U-shaped spring clip embracing each bearing, the legs of the clip passing through the opening of the corresponding rail and having outwardly directed ears normally overlapping the edges of the opening in the rail, said clip with the bearing being removable from the opening by pressing the legs of the clip toward each other whereby to disengage the ears from the rail.

Signed by me at Syracuse, New York, this fourteenth day of January, 1929.

THOMAS S. KNAP.